United States Patent
Freienstein et al.

(10) Patent No.: US 10,377,331 B2
(45) Date of Patent: Aug. 13, 2019

(54) METHOD FOR ACTUATING RESTRAINT MEANS FOR A VEHICLE, COMPUTER PROGRAM, ELECTRONIC STORAGE MEDIUM, AND DEVICE FOR ACTUATING RESTRAINT MEANS FOR A VEHICLE

(71) Applicant: Robert Bosch GmbH, Stuttgart (DE)

(72) Inventors: Heiko Freienstein, Weil Der Stadt (DE); Josef Kolatschek, Weil Der Stadt (DE); Stephan Noessner, Stuttgart (DE); Gunther Lang, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1 day.

(21) Appl. No.: 15/573,537

(22) PCT Filed: May 3, 2016

(86) PCT No.: PCT/EP2016/059817
§ 371 (c)(1),
(2) Date: Nov. 13, 2017

(87) PCT Pub. No.: WO2016/180662
PCT Pub. Date: Nov. 17, 2016

(65) Prior Publication Data
US 2018/0105131 A1    Apr. 19, 2018

(30) Foreign Application Priority Data

May 11, 2015   (DE) .................... 10 2015 006 156
Jul. 20, 2015   (DE) .................... 10 2015 213 576

(51) Int. Cl.
| | |
|---|---|
| *B60R 21/0132* | (2006.01) |
| *B60R 21/08* | (2006.01) |
| *B60R 21/0136* | (2006.01) |

(52) U.S. Cl.
CPC ...... *B60R 21/0132* (2013.01); *B60R 21/0136* (2013.01)

(58) Field of Classification Search
CPC ... B60R 21/0132; B60R 21/01; B60R 21/013; B60R 21/2032; B60R 19/483;
(Continued)

(56) References Cited

U.S. PATENT DOCUMENTS 3,495,675 A * 2/1970 Hass ...................... B60R 21/013
    180/274
3,718,332 A * 2/1973 Jones ...................... B60R 21/01
    280/735

(Continued)

FOREIGN PATENT DOCUMENTS

| DE | 19537350 A1 | 4/1996 |
| DE | 19710451 A1 | 4/1998 |
| DE | 10012434 A1 | 5/2001 |

OTHER PUBLICATIONS

International Search Report dated Jul. 11, 2016, of the corresponding International Application PCT/EP2016/059817 filed May 3, 2016.

*Primary Examiner* — Yuri Kan
(74) *Attorney, Agent, or Firm* — Norton Rose Fulbright US LLP; Gerard Messina (57) ABSTRACT

A method for actuating restraint means for a vehicle, the method having the following steps: detecting, at a first instant, at least one first value that represents an acceleration; ascertaining a value that represents a force acting on the vehicle from the detected at least one first value that is representative of an acceleration; actuating the restraint means as a function of the ascertained value and/or a value that is derived from the ascertained value.

15 Claims, 4 Drawing Sheets

(58) Field of Classification Search
CPC .......... B60R 21/08; B60W 30/08; G01L 5/00; G01P 15/0802; G01S 7/78
See application file for complete search history.

(56) References Cited

U.S. PATENT DOCUMENTS

| | | | | |
|---|---|---|---|---|
| 5,326,133 | A * | 7/1994 | Breed | B60R 19/483 |
| | | | | 180/274 |
| 5,667,244 | A * | 9/1997 | Ito | B60R 21/0132 |
| | | | | 180/282 |
| 5,777,227 | A * | 7/1998 | Cho | G01P 15/0802 |
| | | | | 73/514.01 |
| 5,793,005 | A * | 8/1998 | Kato | B60R 21/013 |
| | | | | 180/282 |
| 5,904,730 | A * | 5/1999 | Yamazaki | B60R 21/0132 |
| | | | | 180/271 |
| 6,189,919 | B1 * | 2/2001 | Sinnhuber | B60R 21/2032 |
| | | | | 188/377 |
| 2009/0276125 | A1 * | 11/2009 | Brandmeier | B60R 21/013 |
| | | | | 701/47 |
| 2015/0039156 | A1 * | 2/2015 | Shibata | B60T 7/22 |
| | | | | 701/1 |
| 2016/0178465 | A1 * | 6/2016 | Smith | G01L 5/0052 |
| | | | | 702/41 |

* cited by examiner

METHOD FOR ACTUATING RESTRAINT MEANS FOR A VEHICLE, COMPUTER PROGRAM, ELECTRONIC STORAGE MEDIUM, AND DEVICE FOR ACTUATING RESTRAINT MEANS FOR A VEHICLE

FIELD

The present invention relates to a method for actuating restraint means for a vehicle, to a corresponding computer program, and a corresponding electronic storage medium on which the computer program is stored. It also relates to a corresponding device for actuating restraint means for a vehicle.

BACKGROUND INFORMATION

Modern restraint systems are typically actuated with the aid of methods that use measuring data from acceleration sensors mounted in certain locations inside the vehicle. A decisive factor for the actuation or activation of restraint means is that a certain accident severity is reached. For example, it makes no sense to activate the restraint means such as airbags in response to a minor collision at a low collision speed. The restraint means offer barely any additional protection at such speeds. On the other hand, a collision at high speeds against a rigid wall with complete overlap (such as during the USNCAP test) or with a 40% overlap against a deformable barrier (such as during the EuroNCAP test) requires a timely activation of all available restraint means within the shortest period of time in order to better protect the occupants. A broad spectrum of different demands on the actuation of the restraint means as a function of the injury risk of the occupants, and thus as a function of the crash severity, exists between these extremes.

SUMMARY

Inter alia, the following disadvantages of the conventional systems may be addressed by the present invention:
  The low-pass filtering employed in the related art in the preprocessing of the acquired sensor signals, in particular the acceleration signals, lacks a physical basis. Because of that, information that could be exploited for determining the crash severity goes unused, and it may affect the signal characteristic to an undesired extent.
  In particular, the low-pass filtering only results in an approximation of the center of mass acceleration of the vehicle that is unsatisfactory in terms of quality.
  The low-pass-filtered acceleration signal generally overestimates the amplitude of the acceleration in the particular ranges in which the amplitude increases, and it underestimates the amplitude in the ranges in which the amplitude decreases, relative to the correct center of mass acceleration of the vehicle.
  The parameters of the low-pass filtering are unable to be derived from the vehicle characteristics, which therefore means that they have to be determined anew for each vehicle at a certain expense.
  The influence of the sensor installation location on the characteristic of the crash signals is unable to be estimated in advance.
  If high-frequency signal components are taken into account when determining a trigger decision, then it is not always clear whether they involve robust features.
  No calculation of physical quantities that are directly related to the crash severity takes place, such as force F, rate of deformation $V_{defo}$, and stiffnesses D.
  An algorithm that does not explicitly calculate these quantities is difficult to verify and may cause problems if data from predictive systems or from car2car communications are to be taken into account in the decision finding. The inference of the crash severity is drawn only implicitly (e.g., via the instant when the threshold is exceeded).
  The application process of current algorithms is very complex because it requires data from a multitude of crash tests despite the fact that the same vehicle and the same construction are involved in each situation.

Against this background, the present invention provides a method for actuating restraint means for a vehicle, the method having the following steps:
  Detecting, at a first instant, at least one first value that is representative of an acceleration;
  Ascertaining a value that is representative of a force acting on the vehicle from the detected at least one first value that is representative of an acceleration;
  Actuating the restraint means as a function of the ascertained value.

In accordance with the present invention, collision-dependent physical quantities are ascertained on the basis of construction-related properties of the vehicle for the actuation of restraint means of the vehicle in the event of a collision.

In this instance, a method for the actuation of restraint means describes calculation and/or processing rules for detected sensor signals that result in an actuation decision for one or more restraint means of a vehicle or in the generation of an actuation signal.

Herein, restraint means, among other things, are the technical systems of a vehicle that are suitable for protecting the body and life of the occupants or other parties involved in a collision and for keeping them safe. Among these systems are airbags, belt pretensioners, active headrests, active engine hoods, active vehicle seats and the like.

The force acting on the vehicle in reality is determined with high precision and virtually in real time on the basis of an acceleration sensor mounted at an arbitrary location in the vehicle. In addition, the exact knowledge of the mechanisms that created the high-frequency signal components and their utilization for the independent and robust determination of crash-dependent collision parameters allows for a further improvement in the accuracy of the actuation of the restraint means.

Advantages of the present invention are therefore, inter alia, the following:
  An embodiment of the present invention is based, in a direct and allocatable manner, on physical rules and is therefore easily and inexpensively transferable to a wide variety of vehicles inasmuch as the relevant parameters are able to be determined with the aid of a simple measurement.
  It may improve the accuracy of the determination of crash-relevant physical parameters because the information content of the measured signals is optimally utilized, and existing knowledge of the construction of the vehicle is exploited. This allows for a more nuanced grading in the determination of the crash severity, which in turn allows for an actuation of restraint systems (RHS) that make higher demands, as specified by adaptive restraint systems RHS, for example.

The example method is also applicable to vehicle structures that feature novel materials, for instance when the deformation structures of a vehicle are made from carbon-fiber reinforced plastic, for instance.

By applying the example method, the application process of the trigger algorithm is able to be carried out more rapidly and effectively because, for one, the volume of required crash data is reduced and, for another, many settings are already able to be adjusted on the basis of the constructive features of the vehicle.

In one advantageous further development of the example method in accordance with the present invention, the value that is representative of a force that is acting on the vehicle is ascertained with the aid of vehicle- and/or installation-specific parameters ($K_0$ through $K_n$, as well as $\Delta t_0$ through $\Delta t_n$). The parameters are suitable for describing the effects of the vehicle structure on the propagation of an acceleration signal generated by a force acting on the vehicle.

The parameters therefore make it possible to ascertain the force that is acting on the vehicle with a very high degree of accuracy from a measured acceleration signal.

The parameters are vehicle- and/or installation-specific. In particular, they reflect the influences exerted by the vehicle structure up to and including the installation location of the sensor used for detecting an acceleration.

The parameters ($K_0$ through $K_n$, as well as $\Delta t_0$ through $\Delta t_n$) are able to be ascertained by experimental measurements on the vehicle. For such a purpose, forces may be applied to the vehicle at different locations in the vehicle, e.g., to the front structure. The effects of these forces, i.e., propagating acceleration signals in the vehicle, are measurable at different locations. For example, short, Gaussian-shaped force pulses or other defined force pulses may be applied to the vehicle as forces. The parameters are able to be ascertained from the measured acceleration signals and from the acting forces.

In this context the following relation applies to the parameters:

$$a(t)=k_0 F(t-\Delta t_0)+k_1 \dot{F}(t-\Delta t_1)+k_2 \dot{F}(t-\Delta t_2)=k_3 \dot{F}(t-\Delta t_3)+\ldots,$$

where $\dot{F}$ represents the derivation of the force with respect to time, $k_i$ represents vehicle-specific parameters, and $\Delta t_i$ denotes vehicle-specific signal-propagation times, with i= 0, . . . n.

In one advantageous development of the present method, a value that is representative of an instantaneous deformation depth is ascertained.

A force-travel characteristic for the components of a vehicle involved in a collision is able to be ascertained through experiments or calculations. The travel in this characteristic then corresponds to the deformation depth. However, since the values ascertained according to the present method and representing a force acting on the vehicle are dependent on the further progression of the collision and hence are a function of time, the following comments indicate which methods may be used in such a case for the purpose of allocating the ascertained force acting on the vehicle and applying to the force-travel characteristic for the vehicle, and which trigger-relevant parameters are able to be derived therefrom according to advantageous specific embodiments of the present method.

The goal of the comparison is the allocation of a specific value that is representative of a force acting on the vehicle and that corresponds to a specific deformation depth, currently still unknown, to the corresponding value of the force-travel characteristic. If this allocation takes place, the value will be able to be allocated to a very specific deformation depth. It is then the case that the force of the force-travel characteristic corresponds to the ascertained force acting on the vehicle.

According to specific embodiments of the present method, the instantaneous deformation depth is able to be ascertained in the following manner:

Case a: The force-travel characteristic exists as a strictly monotonically increasing function of s. In this case, a direct formation of the inverse function s=f(F) is possible.

The allocations of a value that is representative of a force to a value that is representative of a deformation depth are stored in a corresponding device (e.g., a control unit) in a suitable manner (e.g., as a table or in parameterized form such as in the form of the descriptive parameters of a polynomial that approximates these values in a suitable manner). During the application, e.g., in the event of a collision, the values that were ascertained in the previous steps and that represent a force acting on the vehicle are then used for a determination, directly with the aid of this allocation, of the deformation depth allocated to the values, and are made available for further processing. The associated time (preferably counted from the start of the crash) is also stored.

Case b: The force-travel characteristic is only available as a monotonically increasing function. In contrast to the specific embodiment according to case a, the inverse function is not formed in one piece but only for the segments in which the function is increasing strictly monotonically. In the further evaluation, the method as described according to the specific embodiment of case a is used in an analogous manner. For the particular sections of the function that are not strictly monotonic, no clear allocation of the ascertained force to a deformation depth is able to be carried out. In such a case, a corresponding value is output that characterizes an overdetermination (e.g., by setting a flag), so that values that fall inside this interval are treated accordingly in the subsequent further evaluation (are ignored, for instance).

Case c: The force-travel characteristic is available neither as a strictly monotonic nor as a monotonically increasing function but rather represents an arbitrary allocation (function). In such a specific embodiment of the present method, either method b) or a suitable standardization method may be used for the corresponding segments.

If a method is used that is similar to the conventional method of 'dynamic time warping', as in speech recognition, for example, then the "setpoint sequence" of the force-travel characteristic corresponds to the specific embodiment of the present invention, and the "time-warped sequence" corresponds to the characteristic of the ascertained values that represent a force acting on the vehicle. The result of the application of the present method is once again an accurate allocation of the instantaneous point in time to an instantaneous deformation depth by way of the value that was ascertained according to the present method and represents a force acting on the vehicle.

In one advantageous further development of the present method, a velocity decay is ascertained from the time integration of the ascertained values that represent a force acting on the vehicle. The values that represent a force acting on the vehicle may be understood as values that represent the center of mass acceleration of the vehicle. It is assumed in the relation that the center of mass acceleration corresponds to the value that is representative of the force divided by the mass of the vehicle. An integration or a summing up of these values results in a measure for the velocity decay.

As an alternative, a direct calculation of a velocity change may also be carried out in the conventional manner, by integration, from the detected acceleration value of the acceleration sensor. However, the present method is superior to the conventional method inasmuch as it allows for a more precise calculation of the rate of change in the velocity of the center of mass of the vehicle. The conventional method overestimates the rate of change in the velocity, especially at the start of the crash. The mass of the vehicle may either be stored as a value in the memory of a control unit, or it is determined indirectly from properties of the vehicle dynamics or from the combination of engine-control parameters and a resulting linear acceleration of the vehicle or from brake-actuation parameters and a resulting linear deceleration, or from a combination of one or more of these methods.

In one advantageous development of the present invention, according to which a crash type is determined in an additional step on the basis of a comparison of the ascertained value that is representative of a force acting on the vehicle with the value that is representative of a force acting on the vehicle as a function of the instantaneous deformation depth, the restraint means are able to be actuated in a more optimal manner. For example, based on the detected crash type, the improved actuation of the restraint means could be implemented directly via a table that is specific to the restraint system or the vehicle, or via a further method or sub-method.

The predefined force-travel characteristic may describe the force that is acting in a collision of the "partial overlap" crash type. If the force characteristic that corresponds to essentially twice the force-travel characteristic is ascertained in the process, then a collision of the "full overlap" crash type is at hand. One skilled in the art knows that the ascertained force and the force-travel characteristic need not be linked exactly via the factor '2', i.e., in a twofold manner.

If a comparison of the ascertained force to the known force-travel characteristic is carried out, then it is possible to make statements regarding the collision type and to employ them for actuating the restraint means. The ascertained force is compared to the respective corresponding value of the force-travel characteristic. 'Corresponding' in this context means that the ascertained force value and the force-travel characteristic are in correspondence if they correspond to the same instantaneous deformation depth.

a) Crash type "accident with full overlap": This crash type is encountered when the ascertained force essentially corresponds to twice the force-travel characteristic.

(Both load paths of the vehicle are deformed in the collision. No force that is lower than the ego vehicle's own deformation force arises, or in other words, the opponent is not experiencing a deformation.)

b) Crash type "accident with full overlap against a deformable obstacle":

This crash type is encountered when the ascertained force is essentially greater than the simple force-travel characteristic and at the same time less than twice the force-travel characteristic.

(Both load paths are deformed in the collision, but the ascertained force is lower than the force to be expected in the case of a rigid obstacle. Hence, the collision partner is deformable to a certain extent.)

c) Crash type "accident against a deformable object with 'full overlap' or 'partial overlap'":

This crash type is encountered when the ascertained force is lower than the force-deformation characteristic.

(Since the ascertained force is less than the force required for the deformation of the ego-vehicle, it necessarily follows that the other party is currently undergoing a deformation. No direct statement regarding the degree of overlap is initially able to be made since either an accident with full overlap with an opponent having very low stiffness is involved, or an accident with partial overlap with an opponent having somewhat higher stiffness.)

Depending on the specific embodiment, various methods are available for determining whether and in what way the ascertained force corresponds to the known force-travel characteristic, such as the methods discussed below.

Method 1:

The maximum force that arises within a specific time interval is compared to the maximum of the force across a specific deformation-depth interval.

This method may be realized according to different specific embodiments.

Specific Embodiment 1

The force characteristic in conventional crash structures is typically such that a plateau or a decrease in the force can be observed after an initial increase in the force. The plateau or decrease in the force is attributable to the occurrence of a first folding process of a crash structure. Since these features are easily detectable in the ascertained force value (e.g., by methods for peak detection or plateau detection known to one skilled in the art), the interval for determining the maximum of the ascertained force value is dynamically specifically configured for this crash phase, i.e., from the start of the crash to the first folding process. The comparison value of the force-travel characteristic Max then corresponds to the deformation depth at a maximum force level during the corresponding interval.

Specific Embodiment 2

Crash structures made of other materials, e.g., of carbon-fiber reinforced plastic, generally do not exhibit a pattern of this kind. However, they frequently exhibit the feature of a very uniform and constant force level, which is reached after a first increase in the force. In this case, the present method would initially determine the constant force level of the ascertained force through a homogeneity detection or plateau detection, and would then allocate it to the corresponding force-travel characteristic.

Method 2:

In an alternative specific embodiment of the present method, it is checked both whether the ascertained force corresponds to the force-travel characteristic for the simple overlap crash type and whether the ascertained force corresponds to the force-travel characteristic for the full overlap. Using a suitable quality and agreement measure, it is checked which force-travel characteristic is a better fit for the ascertained force.

Method 3:

First, similar to method 2, the correspondence between the ascertained force and one of the force-travel characteristics is checked. In addition, a deviation of the ascertained force or the characteristic of the ascertained force from the force-travel characteristic is determined. If a deviation occurs in the direction of forces that are lower than would correspond to the force-travel characteristic, then the collision opponent involves a deformable object. Depending on the correspondence to the force-travel characteristic for the partial or full overlap, a statement regarding the overlap degree is provided. Thus, a complete determination of the collision event is possible according to the criteria of full overlap or partial overlap, rigid obstacle or deformable obstacle, and an actuation of the restraint means may be carried out as a function of this information.

In one advantageous development of the present method, a rate of deformation of the vehicle is ascertained from successive allocations of instants of an ascertained force value to the deformation depth that corresponds to the ascertained force value as well as to the velocity decay ascertained at this instant.

On the basis of the ascertained deformation depth at specific points in time, the average rate of deformation of the ego-vehicle present during this time interval is able to be determined with the aid of the following generally conventional formula:

$$v_{defo} = \frac{s_{n+1} - s_n}{t_{n+1} - t_n} = \frac{\Delta s}{\Delta t}$$

One skilled in the art will know that the quality or, in other words, the accuracy, of the ascertainment of the rate of deformation is able to be improved using various methods, such as the choice of the length of the time interval that is taken into account or via median filtering of the input values.

In one advantageous embodiment of the present method, the stiffness of the collision opponent is ascertained, and a minimum rate of deformation of a collision opponent is determined as a function of the ascertained rate of deformation of the vehicle and as a function of the value that is representative of a velocity decay.

The stiffness of the collision opponent is an important quantity for determining the actuation of restraint means. In the case of opponents that exhibits high stiffness, the occupants reach a critical forward displacement much faster, and the restraint means must be activated more rapidly in order to achieve a satisfactory coupling between the occupants and the restraint system.

The instantaneous stiffness of the collision opponent is able to be expressed by a force that is normally a function of the instantaneous deformation depth of the collision opponent.

As described above, an allocation of the ascertained force to an instantaneous deformation depth is able to take place. It is likewise known that a deformation of the collision opponent occurs precisely at the point at which the instantaneous stiffness of the collision opponent is less than the instantaneous stiffness of the ego-vehicle.

It is possible to calculate the rate of deformation of the collision opponent in such a case. The stiffness of the collision opponent may then be ascertained with the aid of the following method:

If the instantaneous rate of deformation of the ego-vehicle is very low and the calculated instantaneous rate of deformation of the opponent exceeds a specific value, then the ascertained value that is representative of a force acting on the vehicle corresponds directly to the instantaneous stiffness of the opponent.

The criteria 'very low' and 'exceeds a specific value' may be present in the form of predefined threshold values. Their purpose is to increase the robustness of the system.

In a more advanced specific embodiment, the application of heuristic information is used to support the mass estimate.

Additional inferences with regard to the accident opponent may be derived from the values for the instantaneous stiffness of the collision opponent. For example, the opponent may be subdivided into specific classes as a function of this value, such as: (1) soft, (2) normal, (3) hard. A further allocation may also take place. Because the hardness of a collision opponent usually correlates to its mass, an allocation to a weight or to a weight class of the collision object is able to be made using the knowledge of the stiffness or the hardness. For example, 1. soft→lightweight object
2. normal→object of medium weight
3. hard→heavy object (e.g., a truck, fixed obstacle)

Of course, the allocation and the subdivision may be made more nuanced if desired and be carried out in a selectable order.

In a corresponding manner, the present method may also be used for the detection of objects of a different type that feature a very special combination of mass, stiffness and degree of overlap in the collision, i.e., pedestrians, posts, etc.

In a further specific embodiment, it is possible for such a classification, because of the fact that not only the instantaneous value of the opposing stiffness is used but its stiffness-deformation characteristic is calculated and is e.g. compared to a catalogue of existing stiffness-deformation characteristics. If still further variables, e.g., the vehicle mass, are also stored in the catalogue at the same time, a more precise characterization of the collision opponent will thereby be able to be carried out, thus allowing for a more precise actuation of the restraint means. In the process, its stiffness-deformation characteristic may be calculated in the following manner:

In addition or as an alternative to the described method, the initial rate of deformation may be utilized as an approximation for the crash velocity and thus as a parameter of the crash-severity determination required for the actuation of the restraint means.

As a result, a further alternative specific embodiment of the present method allows for an ascertainment of an estimate of the initial crash velocity on the basis of the rate of increase in the characteristic of the ascertained values that are representative of a force acting on the vehicle. This specific embodiment is based on the understanding that in the event of a collision, the ascertained value characteristics essentially orient themselves at the force-travel characteristic of the components involved in the collision during the deformation of the vehicle. All force-travel characteristics have in common that the ascertained value characteristic will represent an increase in the force at the start of a collision. The rate at which the force-travel characteristic is run through is therefore related to the crash velocity.

In this context, the initial increase in the ascertained values will likely take place more slowly in a collision at a lower velocity, and the increase will be rapid at a high velocity. If the form of the increase in the values is approximated by a straight line, then the gradient of this straight line becomes increasingly greater with increasing initial velocity. An independent determination of the initial crash velocity is able to take place by determining the gradient of this straight line and by a comparison with reference values for different crash velocities that are stored in a table.

In one further specific embodiment of the present method, the restraint means are actuated as a function of the ascertained value that is representative of a force acting on the vehicle and as a function of the detected value that is representative of an acceleration of the vehicle.

This specific embodiment is based on the understanding that the detected acceleration signal is composed of multiple components. One of the components is proportional to the center of mass acceleration, and another component is proportional to the first derivation of the force acting on the vehicle as a function of time. In addition, there are still other components that are proportional to the derivation of the force acting on the vehicle as a function of time, but they are shifted further in time and have modified amplitudes. By subtracting the ascertained center of mass acceleration from the detected acceleration values, a new measuring series is produced whose amplitudes are essentially proportional to the first derivation of the force acting on the vehicle as a function of time. As explained above, an increase in the (initial) crash velocity directly effects an increase in the initial rate of increase of the ascertained signal or value that is representative of a force acting on the vehicle. However, it is precisely this rate of increase that is described by the expression of the first derivation of the force acting on the vehicle as a function of time. The amplitude of this derivation thus is directly related to the crash velocity.

Accordingly, the crash velocity is able to be determined according to a method that includes the following steps:

Sequence:

1. Ascertaining a value that is representative of a force acting on the vehicle from at least one detected acceleration signal.

2. Deriving a value that is representative of a center of mass acceleration of the vehicle from the value that is representative of a force acting on the vehicle.

3. Determining a difference between the at least one detected acceleration signal and the derived value that is representative of a center of mass acceleration of the vehicle.

4. Determining a value that is representative of a crash velocity, in particular with the aid of a predefined allocation of the determined difference to a value that is representative of a crash velocity.

5. Actuating the restraint means additionally as a function of the determined value that is representative of a crash velocity.

This method is suitable in particular for deformation structures made from materials such as carbon-fiber reinforced plastics since, apart from the first increase in the force-travel characteristic, it requires no further signal features for ascertaining the crash velocity.

Additional specific embodiments and a supplementation of the present method are described in the following text.

Instead of the force-travel characteristics that describe the force characteristics in the case of a partial overlap or a full overlap, it may be useful to provide force-travel characteristics that describe changed crash geometries or crash types such as angle collisions (e.g., RCAR 10°). The existing crash type is defined in greater detail by using for the further evaluation the particular force-travel characteristic that has the greatest agreement, via a suitable similarity measure, with the detected and determined value or value characteristics.

The initial collision velocity v_0 may also be determined via a predictive sensor system. It will then be used in a manner similar to the one described.

Optionally, it is also possible to calculate a weighted mean value between the ascertained initial crash velocity v_0 and the initial crash velocity determined with the aid of the predictive sensor system, the weighting parameters being proportional to the quality of the data.

Optionally, the method may also be used for a misuse detection. In this instance, misuse means that less efficient methods detect a trigger-relevant collision although no trigger-relevant collision event has actually taken place.

If the allocability of the ascertained values that are representative of a force acting on the vehicle takes place to a force-travel characteristic below a predefined quality, then this is a strong indication of the occurrence of misuse. In such a case, the present invention will not actuate the restraint means, or the present method may be used to prevent an activation of the restraint means.

All described methods may analogously be used also for other accident situations such as a rear collision and/or a side collision.

The main component of the present invention is a physical model that links the temporally varying deformation force that is acting on the vehicle as a result of a collision with an acceleration signal measured at an installation location of the sensor in the vehicle. On the one hand, the use of this model makes it possible to predict the expected vehicle- and installation-specific acceleration signals on the basis of the known force-deformation characteristics of the used components; on the other hand, it is possible to determine the force acting on the vehicle from a measured acceleration in real time and with high accuracy. According to the present invention, this information may then be used in advantageous further developments of the present invention to determine the overlap degree of the collision, the crash velocity, the rate of deformation and the stiffness of the opponent from the trigger-relevant physical quantities. The actuation of the restraint means is able to be derived therefrom.

The crash velocity usually describes the velocity difference between two colliding objects.

In this instance, the rigidity of the collision opponent may be understood as the level of force or the exact force characteristic or a quantity that describes the hardness of the deformation zone.

The present invention is based on the understanding that the force-time characteristic is directly related to the force-deformation characteristic. Depending on the rate of deformation $V_{defo}$, a specific deformation depth is reached at a specific time, and the force-travel characteristic predefined by the involved components is thereby made to take effect. Rate of deformation $V_{defo}$ depends on crash velocity $V_{crash}$ and the nature (i.e. stiffness, inter alia) of the collision opponent.

In the following text, details of the model and especially the foundations of the model on which the present invention is based are illustrated with the aid of the drawing.

DETAILED DESCRIPTION OF EXAMPLE EMBODIMENTS

Figure 1:
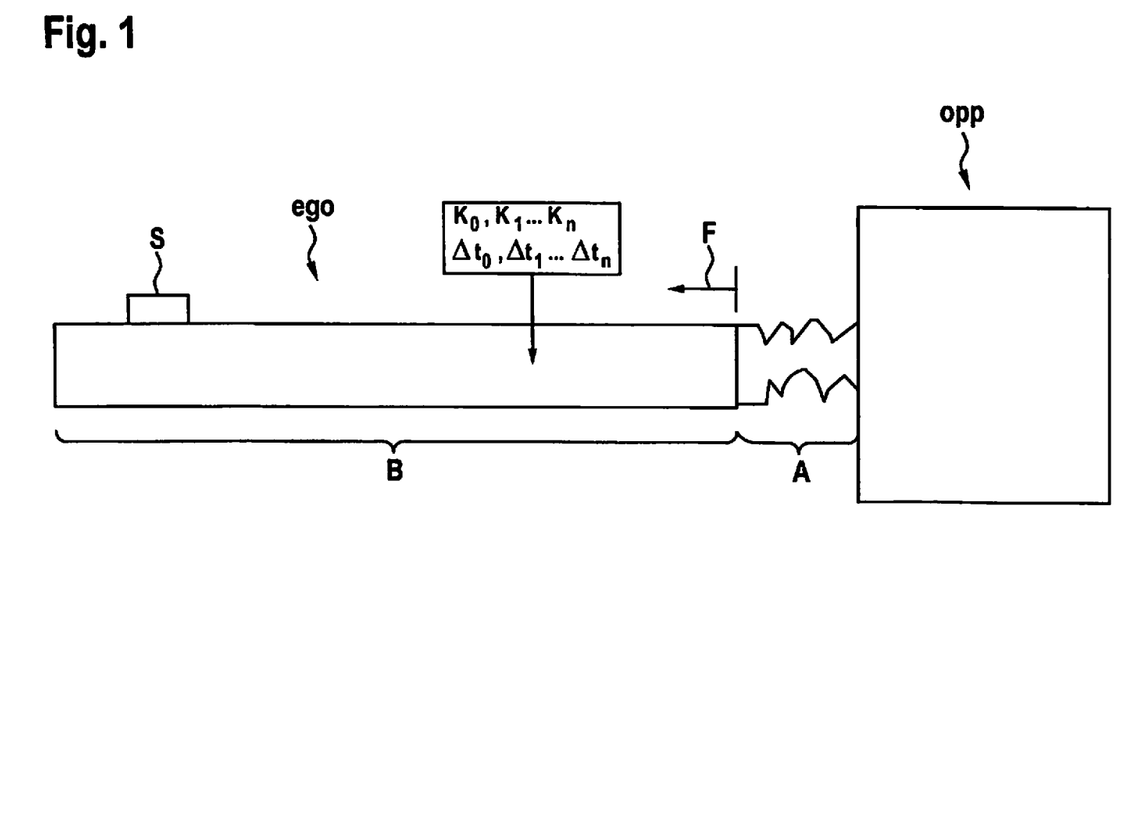
FIG. 1 shows an illustration of a model that forms the basis of the present invention.

FIG. 1 shows an illustration of a model that forms the basis of the present invention.

A model that forms the basis of the present invention theoretically breaks down the ego-vehicle into two components.

The first component is predominantly made up of deformation zone A or the crash zone in which a plastic deformation for the most part takes place as a result of contact with a collision opponent opp (e.g., a barrier in a crash test, and an obstacle, another vehicle or a collision opponent in a real accident). For design-related reasons, this deformation zone A generally has a force-travel characteristic F(s) that varies only slightly in modern vehicles, 's' denoting the deformation depth. In conventional vehicle constructions, this zone corresponds to the "crash box" or "deformation element" modules, for instance. The second component consists of remaining vehicle B, which experiences mainly elastic deformations under the loads that arise during an accident. A detection device S, e.g., an acceleration sensor, is located in an arbitrary yet specified location of this component.

If a collision then takes place, deformation zone A is deformed at a rate of deformation $v_{defo}$ that depends on collision velocity $V_{crash}$ and the nature of collision opponent opp, and a time-dependent force F(t) that acts on second component B, i.e. the ego-vehicle, is generated as a result.

In second component B, this action leads to a wave that propagates in space. The acceleration signal that results from the dual derivation of the displacement u(x, t) as a function of time may be represented with the aid of the acting force F(t) by the relation $$a(x, t) = \frac{d^2u}{dt^2}(x, t) = \frac{c}{EA}\frac{dF}{dt}\left(t - \frac{x}{c}\right)$$

(x=0 denoting the location of the action of force). c is the propagation speed of the wave, and E and A are material parameters. The expression c/(E*A) may be replaced by a vehicle- and installation-location-dependent constant and be denoted by $k_0$, for example.

If this propagating wave now encounters inhomogeneities in the propagation path, reflection effects will occur. Depending on the nature of the inhomogeneity, the entire wave or a portion of the wave is reflected, it being possible once again as a function of the nature of the inhomogeneity that the algebraic sign of the reflection changes or stays the same in relation to the original wave. Such inhomogeneity locations in vehicle ego are typically the transition of the longitudinal member to the passenger compartment or the region in the structure where creases or beads are located. Locations that have great differences in mass also have this effect, as does the reaching of the end of a corresponding load path.

Accordingly, sequential inhomogeneities lead to multiple reflections of the signal. The change in the reflected signal in comparison with the original signal may be described by a factor k, k denoting the change in the amplitude (height and algebraic sign) of the wave.

Different reflections are therefore made up of individual wavetrains with corresponding that may be described by factors $k_1$ through $k_n$.

Since the reflected waves travel a different (longer) path than the first directly generated wave according to the above relation, a time difference $\Delta t_n$ that describes the time delay in relation to the acting force must additionally be taken into account. In addition to the described wave propagation, the measured acceleration signal may also include a component that is proportional to the acting force (according to Newton's second law; a=F/m). It may be interpreted as a center of mass acceleration to which the center of mass of the vehicle is subjected due to the collision.

As a result, the final description of the acceleration signal, detected as a function of the acting force F(t), for a specific vehicle at a specific installation location, reads:

$$a(t)=k_0 F(t-\Delta t_0)+k_1\dot{F}(t-\Delta t_1)+k_2\dot{F}(t-\Delta t_2)=k_3\dot{F}(t-\Delta t_3)+\ldots$$

If force F(t) is given and the model parameters $k_0$ through $k_n$ as well as the corresponding $\Delta t_0$ through $\Delta t_n$ are known, then it is possible to calculate the acceleration signals to be expected directly.

The equation may also be solved for the quantity F(t). If acceleration signal a(t) is given, and if the model parameters $k_0$ through $k_n$ as well as the corresponding $\Delta t_0$ through $\Delta t_n$ are known, then the equation may be solved for F(t), and force F(t) may be calculated on that basis. Relevant parameters for the actuation of restraint means are then able to be determined from the application of this equation and the ascertainment of quantity F(t).

Figure 2:
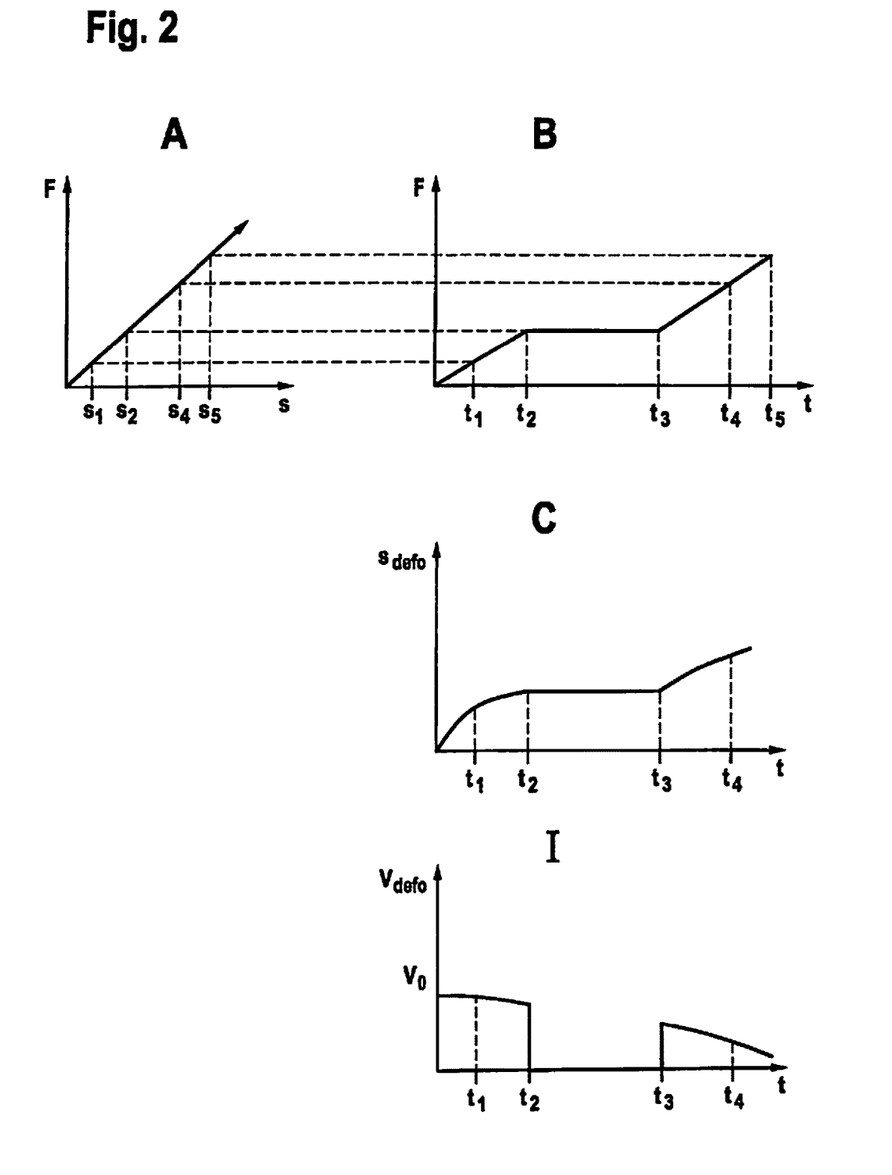
FIG. 2 shows a plurality of graphs that illustrate the relationship between detected values that are representative of an acceleration, the values that correspond thereto and represent a force acting on the vehicle, as well as the corresponding deformation depth.

FIG. 2 shows a plurality of graphs that illustrate the relationship between the detected values that are representative of an acceleration, the values that correspond thereto and represent a force acting on the vehicle, as well as the corresponding deformation depth.

The graph denoted by A illustrates a simplified force-deformation characteristic. Deformation depth s is plotted on the abscissa, and the force that is allocated to the deformation depth and acting on the vehicle is plotted on the ordinate. This allocation is able to be determined through experiments or calculations and is available to the present invention.

The graph denoted by B shows an exemplary force characteristic acting on the vehicle that was ascertained from detected accelerations. Since the force-deformation characteristic is a strictly monotonically increasing function, a corresponding instant $t_1$, $t_2$, $t_4$, $t_5$ is able to be allocated to each deformation depth $s_1$, $s_2$, $s_4$, $s_5$ with the aid of the force-time characteristic and the force-deformation characteristic.

What stands out in the exemplary force-time characteristic is the ascertained plateau. This plateau indicates that no change has occurred in the force acting on the vehicle during this interval. However, since the force-travel characteristic is increasing in a strictly monotonic manner, it may be concluded that the deformation of the ego-vehicle has not progressed any further. Hence, it is not the ego-vehicle that is deformed during this interval but rather the collision opponent opp.

The result of the allocation of the ascertained force-time characteristic to the force-travel characteristic is the graph denoted by C, which illustrates a deformation-time characteristic.

The graph denoted by the Roman numeral I shows a rate of deformation-time characteristic that is based on the ascertained deformation-path time characteristic. Clearly to be gathered from this graph is also that no rate of deformation is present within the interval between $t_2$ and $t_3$, in which the ascertained force acting on the vehicle assumes a plateau characteristic, or in other words, the host vehicle ego is deformed at rate of deformation $v_{defo}=0$. The rate of deformation time characteristic starts out with a velocity $v_o$, which is also denoted as the crash or collision velocity.

Figure 3:
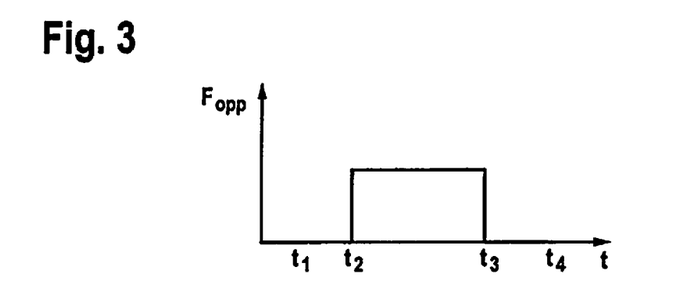
FIG. 3 shows a graph that represents the contribution of a collision opponent in the force characteristic.
Figure 4:
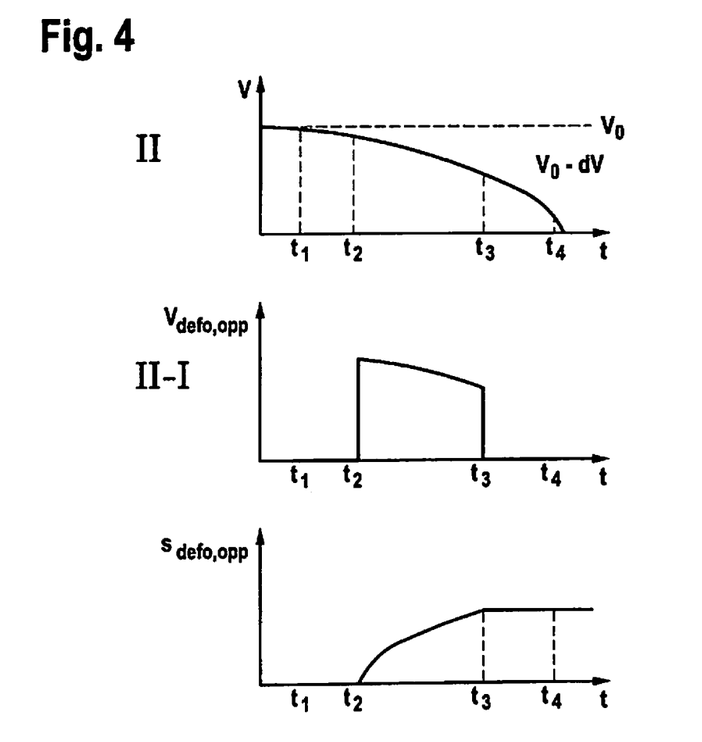
FIG. 4 shows additional graphs.

FIG. 3 shows a graph that represents the contribution of collision opponent opp, F_opp, in the force characteristic. Up to instant $t_2$, the force level of the structure in vehicle ego is lower, which is the reason why only vehicle ego is deformed in this time range. In interval $t_2$ through $t_3$, during which the characteristic of the acting force in vehicle ego forms a plateau, the force level of the structure of collision opponent opp is lower than the force level of the structure of vehicle ego, which is why collision opponent opp is deformed within this time range. FIG. 4 shows additional graphs. The graph denoted by the Roman numeral II also shows a velocity-time characteristic for the same event, but it is calculated according to another method: Here, detected velocity decay dV is successively deducted from collision velocity $v_0$. The deducted velocity decay dV is obtained from the ascertained values that are representative of a force acting on the vehicle. In the process, the ascertained values are divided by the mass of the ego-vehicle in order to thereby obtain the center of mass acceleration. These values are then integrated or added up and deducted from the previously ascertained crash velocity $v_0$.

The graph denoted by Roman numeral II-I shows the resulting graph when the characteristic according to graph I (FIG. 2) is deducted from the characteristic according to graph II (FIG. 4). The illustrated characteristic represents rate of deformation $v_{defo,opp}$ of collision opponent opp.

Deformation depth $s_{defo,opp}$ of collision opponent opp results from the integration of rate of deformation $v_{defo,opp}$ of collision opponent opp.

On the basis of the deformation-time characteristic of collision opponent opp and knowledge of the force acting on collision opponent opp (graph from FIG. 3), it is possible to ascertain a force-travel characteristic of collision opponent opp.

Figure 5:
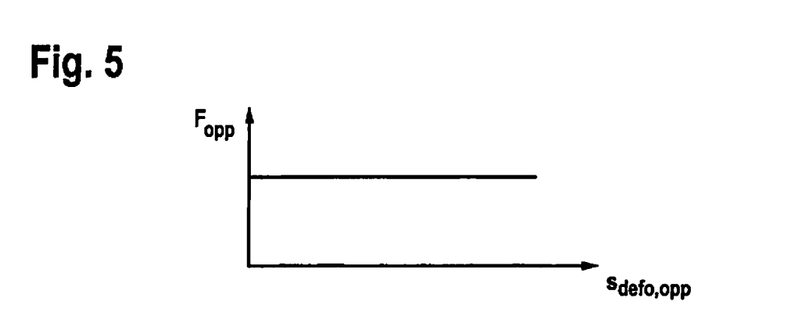
FIG. 5 shows a graph of a force-travel characteristic of a collision opponent.

Such a characteristic is shown in FIG. 5 in the form of a graph.

Figure 6:
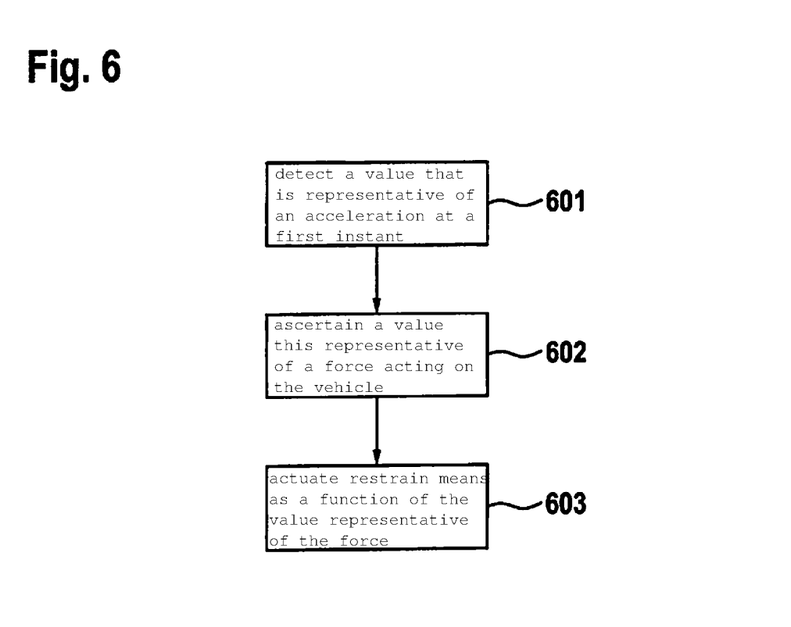
FIG. 6 shows a flow diagram of an example method in accordance with the present invention.

FIG. 6 shows a flow diagram of present method 600. In method step 601, a value a(t) that is representative of an acceleration is detected at a first instant t.

In method step 602, a value F(t) that is representative of a force acting on the vehicle is ascertained from the value that is representative of an acceleration.

In method step 603, restraint means RHS are actuated as a function of the ascertained value F(t) that is representative of a force acting on vehicle ego or as a function of a value derived from this value.

What is claimed is:

1. A method for actuating a restraint device for a vehicle, the method comprising:
   detecting, at a first instant, at least one first value that is representative of an acceleration,
   ascertaining a value that is representative of a force acting on the vehicle from the detected at least one first value that is representative of the acceleration, and
   actuating the restraint device as a function of at least one of the ascertained value that is representative of the force acting on the vehicle, and a value derived from the ascertained value that is representative of the force acting on the vehicle,
   wherein in the step of ascertaining, the ascertained value that is representative of the force acting on the vehicle is ascertained as a function of predefined, at least one of vehicle-specific parameters and installation-specific parameters, the at least one of the vehicle-specific parameters and installation-specific parameters describing influences of a structure of the vehicle on a propagation of an acceleration signal generated by the force acting on the vehicle, the structure of the vehicle including a crash deformation structure of the vehicle.

2. The method as recited in claim 1, further comprising:
   determining a value that is representative of an instantaneous deformation depth of a deformation zone of the vehicle as a function of the ascertained value that is representative of the force acting on the vehicle;
   wherein in the actuating step, the restraint device are also actuated as a function of the determined value that is representative of the instantaneous deformation depth.

3. The method as recited in claim 2, wherein in the determining step, the value that is representative of an instantaneous deformation depth is determined on the basis of an allocation of the ascertained value that is representative of the force acting on the vehicle, to a predefined value that is representative of the force acting on the vehicle as a function of the instantaneous deformation depth of the deformation zone of the vehicle.

4. The method as recited in claim 3, wherein the allocation exists as a monotonically increasing function, and in the step of determining, at least one of a value is determined, and a flag is raised, when no clear allocation is able to be made.

5. The method as recited in claim 3, wherein in the determining step, the deformation depth is determined as a function of the allocation using a standardization method, the standardization method being a dynamic time warping method.

6. The method as recited in claim 5, wherein the allocation is stored in a storage device.

7. The method as recited in claim 1, wherein in the actuating step, the restraint device is also actuated as a function of the detected at least one first value that is representative of the acceleration.

8. The method as recited in claim 1, further comprising:
   ascertaining a value that is representative of a velocity decay, the value that is representative of a velocity decay being ascertained as a function of the ascertained value that is representative of the force acting on the vehicle, by at least one of integrating and summing up the ascertained value that is representative of the force acting on the vehicle or a value derived from this value;
   wherein in the actuating step, the restraint device is also actuated as a function of the ascertained value that is representative of a velocity decay.

9. The method as recited in claim 1, further comprising:
   determining a crash type, the crash type being determined based on a comparison of the ascertained value that is representative of the force acting on the vehicle, to the value that is representative of the force acting on the vehicle as a function of the instantaneous deformation depth;
   wherein in the actuating step, the restraint device is also actuated as a function of the determined crash type.

10. A method for actuating a restraint device for a vehicle, the method comprising:
    detecting, at a first instant, at least one first value that is representative of an acceleration;
    ascertaining a value that is representative of a force acting on the vehicle from the detected at least one first value that is representative of the acceleration;
    actuating the restraint device as a function of at least one of the ascertained value that is representative of the force acting on the vehicle, and a value derived from the ascertained value that is representative of the force acting on the vehicle;

determining a first value that is representative of an first instantaneous deformation depth of a deformation zone of the vehicle at a first instant as a function of the ascertained value that is representative of the force acting on the vehicle;

wherein in the actuating step, the restraint device are also actuated as a function of the determined first value that is representative of the first instantaneous deformation depth;

wherein at least one second value that is representative of the acceleration is detected at a second instant, and a second value that is representative of the force acting on the vehicle as a function of the at least one second value that is representative of the acceleration is ascertained, and a second value that is representative of a second instantaneous deformation depth of the deformation zone of the vehicle as a function of the ascertained second value that is representative of the force acting on the vehicle is determined, and the method further comprising:

ascertaining a rate of deformation of the vehicle as a function of the first instant and the determined first value that is representative of the first instantaneous deformation depth, and as a function of the second instant and the ascertained second value that is representative of the second instantaneous deformation depth;

wherein the restraint device is also actuated as a function of the ascertained rate of deformation, the second instant following the first instant, and the second instant following the first instant in a following computing cycle.

11. The method as recited in claim 10, wherein a minimum crash velocity is ascertained as a function of the ascertained rate of deformation of the vehicle and the value that is representative of a velocity decay, and the restraint device is also actuated as a function of the minimum crash velocity.

12. The method as recited in claim 11, wherein a minimum rate of deformation of a collision opponent is ascertained as a function of the ascertained rate of deformation of the vehicle and the value that is representative of a velocity decay, and the restraint device is actuated as a function of the ascertained minimum rate of deformation of the collision opponent.

13. The method as recited in claim 12, wherein the ascertained minimum rate of deformation of the collision opponent represents a measure for a stiffness of a collision opponent, and the restraint device is actuated as a function of a comparison of the ascertained minimum rate of deformation of the collision opponent, or a value derived therefrom, to at least one predefined threshold value.

14. A non-transitory electronic storage medium on which is stored a computer program for actuating a restraint device for a vehicle, the computer program, when executed by a processor, causing the processor to perform:

detecting, at a first instant, at least one first value that is representative of an acceleration;

ascertaining a value that is representative of a force acting on the vehicle from the detected at least one first value that is representative of the acceleration; and actuating the restraint device as a function of at least one of the ascertained value that is representative of the force acting on the vehicle, and a value derived from the ascertained value that is representative of the force acting on the vehicle;

determining a first value that is representative of a first instantaneous deformation depth of a deformation zone of the vehicle at a first instant as a function of the ascertained value that is representative of the force acting on the vehicle;

wherein in the actuating step, the restraint device are also actuated as a function of the determined first value that is representative of the first instantaneous deformation depth;

wherein at least one second value that is representative of the acceleration is detected at a second instant, and a second value that is representative of the force acting on the vehicle as a function of the at least one second value that is representative of the acceleration is ascertained, and a second value that is representative of a second instantaneous deformation depth of the deformation zone of the vehicle as a function of the ascertained second value that is representative of the force acting on the vehicle is determined, and the computer program further causes the processor to perform:

ascertaining a rate of deformation of the vehicle as a function of the first instant and the determined first value that is representative of the first instantaneous deformation depth, and as a function of the second instant and the ascertained second value that is representative of the second instantaneous deformation depth;

wherein the restraint device is also actuated as a function of the ascertained rate of deformation, the second instant following the first instant, and the second instant following the first instant in a following computing cycle.

15. A device for actuating a restraint device for a vehicle, the device comprising:

an acceleration detector; and a non-transitory electronic storage medium on which is stored a computer program for actuating a restraint device for the vehicle, the computer program, when executed by a processor, causing the processor to perform:

detecting, at a first instant using the acceleration detector, at least one first value that is representative of an acceleration;

ascertaining a value that is representative of a force acting on the vehicle from the detected at least one first value that is representative of the acceleration; and actuating the restraint device as a function of at least one of the ascertained value that is representative of the force acting on the vehicle, and a value derived from the ascertained value that is representative of the force acting on the vehicle;

determining a first value that is representative of an first instantaneous deformation depth of a deformation zone of the vehicle at a first instant as a function of the ascertained value that is representative of the force acting on the vehicle;

wherein in the actuating step, the restraint device are also actuated as a function of the determined first value that is representative of the first instantaneous deformation depth;

wherein at least one second value that is representative of the acceleration is detected at a second instant, and a second value that is representative of the force acting on the vehicle as a function of the at least one second value that is representative of the acceleration is ascertained, and a second value that is representative of a second instantaneous deformation depth of the deformation zone of the vehicle as a function of the ascertained second value that is representative of the force acting on the vehicle is determined, and the computer program further causes the processor to perform:

ascertaining a rate of deformation of the vehicle as a function of the first instant and the determined first value that is representative of the first instantaneous deformation depth, and as a function of the second instant and the ascertained second value that is representative of the second instantaneous deformation depth;

wherein the restraint device is also actuated as a function of the ascertained rate of deformation, the second instant following the first instant, and the second instant following the first instant in a following computing cycle.

* * * * *